United States Patent
Lewis et al.

(10) Patent No.: US 10,845,948 B1
(45) Date of Patent: Nov. 24, 2020

(54) SYSTEMS AND METHODS FOR SELECTIVELY INSERTING ADDITIONAL CONTENT INTO A LIST OF CONTENT

(71) Applicant: Google Inc., Mountain View, CA (US)

(72) Inventors: Justin Lewis, Marina del Rey, CA (US); Ruxandra Georgiana Davies, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 556 days.

(21) Appl. No.: 14/575,758

(22) Filed: Dec. 18, 2014

(51) Int. Cl.
| | |
|---|---|
| G06F 3/0482 | (2013.01) |
| G06F 3/0484 | (2013.01) |
| G06F 3/0485 | (2013.01) |
| G06Q 30/02 | (2012.01) |
| G06Q 50/00 | (2012.01) |

(52) U.S. Cl.
CPC .......... G06F 3/0482 (2013.01); G06F 3/0485 (2013.01); G06F 3/04842 (2013.01); G06Q 30/0269 (2013.01); *G06Q 50/01* (2013.01)

(58) Field of Classification Search
CPC ............................. G06F 3/0482; G06Q 30/02
See application file for complete search history.

(56) References Cited

U.S. PATENT DOCUMENTS

| | | | | |
|---|---|---|---|---|
| 2008/0066107 A1* | 3/2008 | Moonka | ............ | G06F 17/30796 725/42 |
| 2014/0059479 A1* | 2/2014 | Hamburg | .......... | G06F 17/30274 715/781 |
| 2014/0101582 A1* | 4/2014 | Bamford | ............... | G06F 3/0482 715/765 |
| 2014/0137013 A1* | 5/2014 | Matas | ................... | G06F 3/0481 715/764 |
| 2014/0165001 A1* | 6/2014 | Shapiro | ................... | G06F 16/54 715/811 |
| 2014/0365320 A1* | 12/2014 | Kanter | ............... | G06Q 30/0277 705/14.73 |
| 2016/0054905 A1* | 2/2016 | Chai | ..................... | G06F 3/0481 715/719 |
| 2016/0088101 A1* | 3/2016 | Batiste | ................... | H04L 67/22 709/224 |

OTHER PUBLICATIONS

Yin et al., "Personalization of web content for wireless mobile device" (published in 2004 IEEE Wireless Communications and Networking Conference, Jan. 1, 2004) (Year: 2004).*

* cited by examiner

*Primary Examiner* — Abhishek Vyas
*Assistant Examiner* — Patrick Kim
(74) *Attorney, Agent, or Firm* — Foley & Lardner LLP (57) ABSTRACT

A user's interaction with a list of content may be monitored and a second item of content may be inserted into the list at a position based on the user's interaction. The additional content may be associated with a first item of content in the list based on the interaction. A direction of scrolling of the list may be monitored, and the second item of content may be inserted into the list in a position subsequent to the first item of content in the direction of scrolling, such that the viewer encounters the second item of content after the associated first item of content. Because the second item of content may be selected to be desirable to viewers of the first item of content, presenting the second item of content subsequent to the first item of content may increase the likelihood of ingestion of the second item of content.

18 Claims, 7 Drawing Sheets

SYSTEMS AND METHODS FOR SELECTIVELY INSERTING ADDITIONAL CONTENT INTO A LIST OF CONTENT

BACKGROUND

Items of content on the Internet, such as videos (including user-created videos), pictures, audio recordings, text, interactive games, quizzes, or other such content, may be displayed or presented in a list, sometimes referred to as a "feed", "stream", "timeline", or by other such names. In some instances, such as with audio or video recordings, the content may be configured to automatically play when displayed by an application as a user scrolls through the list, providing an easy way to ingest content.

SUMMARY

Internet content may be monetized through additional paid content, such as advertising, which may both support server and network infrastructure for the feeds as well as incentivize content creation through payments per viewing and/or interaction. In some instances, in which items of content are individually or serially displayed, advertising may be displayed in banners, adjacent to the content, or in pop-up windows. In some instances with multimedia content, such as videos, advertising may be shown via pre-roll or post-roll videos before or after the content, or as interstitial advertising inserted into a break in the middle of the content.

Many of these implementations for displaying paid content do not work well with feeds or streams, or do not provide for association between the paid content and a specific item of content within the feed—if an advertisement is displayed via a pop-up window over a stream of several items of content by different creators, advertising revenue may be divided amongst all of the content creators. For long feeds or lists of content, this may reduce any individual's share significantly. Such implementations may be particularly unfair for creators of highly popular content that draws many viewers to the feed who have to split revenue with creators of less popular content, and may drive such popular content creators away. Advertising may also be displayed as pre-roll or post-roll videos as part of content within the feed. However, automatic playback of advertising, rather than the desired content, may annoy users. In instances in which items of content in the feed may be very short—e.g. 10 to 30 seconds—presenting even a short pre-roll advertisement before each item of content may quickly lose viewers. Even if advertising is shown at a lower rate, such as on every fifth item of content in the feed, users who are quickly scrolling through the list while looking at video thumbnails to decide which content to view may encounter such advertising too often. Additionally, revenue may still need to be divided amongst several content creators, to avoid penalizing creators simply because of where in the list their content is placed. Advertising may also be inserted into the content, via interstitial advertising played while pausing the content. However, interrupting content may annoy viewers, particularly as content intended for Internet playback rarely has well-defined break points such as the commercial breaks typically present in longer content intended for broadcast television. Additionally, for very short content, such as the 10 to 30 second videos mentioned above, viewers may be annoyed by advertising that interrupts playback and may last longer than the content.

Accordingly, in one implementation of the systems and methods discussed herein, a user's interaction with a stream or list of content may be monitored and additional content, such as advertising, may be inserted into the list at a position based on the user's interaction. The additional content, referred to as a second item of content, may be associated with a first item of content in the list based on the interaction. In one implementation, responsive to a user selecting a first item of content or viewing a first item of content for at least a predetermined time period, a second item of content may be selected and inserted into the list and associated with the first item of content for revenue sharing purposes. In another implementation, a direction of scrolling of the list may be monitored, and the second item of content may be inserted into the list in a position subsequent to the first item of content in the direction of scrolling, such that the viewer encounters the second item of content after the associated first item of content. Because the second item of content may be selected to be desirable to viewers of the first item of content, presenting the second item of content subsequent to the first item of content may increase the likelihood of ingestion of the second item of content.

In further implementations, the frequency of insertion of paid content into a stream may be adjusted based on user interaction or engagement. If the user engages with, interacts with (e.g. selecting or loading an associated website, flagging the item of content for subsequent recall, etc.) or views part or all of an item of paid content, in some implementations, the frequency of subsequent insertion of items of content into the stream may be reduced. In another implementation, a user may skip, delay, or start an item of paid content inserted into the stream early. A user may select to view a paid item of content that would normally be shown interstitially or at a pause during playback of another item of content early, such that the paid item of content is shown first, and the other item of content is played without interruption. Conversely, in some implementations, the user may select not to play the paid item of content during a pause in the other item of content, but rather delay the playback until after the other item of content is complete. In many implementations, to distinguish between automatically playing content in a webpage as opposed to in an application displaying a feed, the format of the display of content may be identified to the content provider. Different methods of inserting additional content may be selected based on the format. In one such implementation, pre-roll paid content may be displayed before automatically playing content on a web page, while paid content may be inserted into a list after associated content in an application.

One implementation disclosed herein is a method for selectively inserting an item of content into a list. The method includes displaying, by a device, a list of items of content. The method also includes detecting, by the device, an interaction associated with a first item of content in the list of items of content, the interaction associated with a parameter and value of the parameter. The method further includes retrieving, by the device, a second item of content, responsive to the detected interaction. The method also includes selecting, by the device, a position within the list for the second item of content from a plurality of a predetermined positions adjacent to the first item of content within the list of items of contents, based on the detected value of the parameter; and inserting, by the device, an identification of the retrieved second item of content into the list adjacent to the first item of content at the selected position.

In some implementations, the method includes detecting a scrolling interaction with the list of items of content in a first direction of scrolling, the value of the parameter comprising a predetermined value corresponding to the first direction of scrolling; selecting the position of the plurality of predetermined positions subsequent to the first item of content in the first direction of scrolling according to the value of the parameter; and inserting the retrieved second item of content into the list subsequent to the first item of content in the first direction of scrolling.

In some implementations, the method includes associating, by the device, display of the retrieved second item of content with a provider of the first item of content. In other implementations, the method includes detecting a selection of the first item of content. In still other implementations, the method includes detecting display of the first item of content, by the device, for a time period greater than a threshold. In a further implementation, the method includes setting the threshold, by the device, responsive to a type or length of the first item of content. In a still further implementation, the method includes setting the threshold to a predetermined percentage of the length of the first item of content.

In some implementations, the method includes determining that a portion of the list identifying the first item of content is fully displayed by the device; and automatically displaying the first item of content, responsive to the determination. In some implementations, the method includes automatically displaying the second item of content subsequent to display of the first item of content.

In another aspect, the present disclosure is directed to a system for selectively inserting an item of content into a list. The system includes a device, comprising a display, an input device, and a processor executing a content position selection engine. The display is configured to display a list of items of content; and the device is configured to detect, via the input device, an interaction associated with a first item of content in the list of items of content, the interaction associated with a parameter and value of the parameter. The device is also configured to retrieve a second item of content, responsive to the detected interaction, and insert an identification of the retrieved second item of content into the list adjacent to the first item of content at a selected position. The content position selection engine is configured to select the position within the list for the second item of content from a plurality of a predetermined positions adjacent to the first item of content within the list of items of contents, based on the detected value of the parameter.

In some implementations, the device is configured to detect a scrolling interaction with the list of items of content in a first direction of scrolling, the value of the parameter comprising a predetermined value corresponding to the first direction of scrolling; and the content position selection engine is configured to select the position of the plurality of predetermined positions subsequent to the first item of content in the first direction of scrolling according to the value of the parameter; the retrieved second item of content inserted into the list subsequent to the first item of content in the first direction of scrolling.

In some implementations, the device is further configured to associate display of the retrieved second item of content with a provider of the first item of content. In other implementations, the device is further configured to detect a selection of the first item of content. In still other implementations, the device is further configured to detect display of the first item of content for a time period greater than a threshold. In a further implementation, the device is further configured to set the threshold, responsive to a type or length of the first item of content. In a still further implementation, the device is further configured to set the threshold to a predetermined percentage of the length of the first item of content.

In some implementations, the device is further configured to determine that a portion of the list identifying the first item of content is fully displayed by the device; and automatically display the first item of content, responsive to the determination. In other implementations, the device is further configured to automatically display the second item of content subsequent to display of the first item of content.

In still another aspect, the present disclosure is directed to a computer-readable storage medium storing instructions that when executed by one or more data processors, cause the one or more data processors to perform operations including: displaying a list of items of content; detecting an interaction associated with a first item of content in the list of items of content, the interaction associated with a parameter and value of the parameter; retrieving a second item of content, responsive to the detected interaction; selecting a position within the list for the second item of content from a plurality of a predetermined positions adjacent to the first item of content within the list of items of contents, based on the detected value of the parameter; and inserting an identification of the retrieved second item of content into the list adjacent to the first item of content at the selected position.

In some implementations, execution of the instructions further cause the one or more data processors to: detect a scrolling interaction with the list of items of content in a first direction of scrolling, the value of the parameter comprising a predetermined value corresponding to the first direction of scrolling; select the position of the plurality of predetermined positions subsequent to the first item of content in the first direction of scrolling according to the value of the parameter; and insert the retrieved second item of content into the list subsequent to the first item of content in the first direction of scrolling.

These implementations are mentioned not to limit or define the scope of the disclosure, but to provide an example of an implementation of the disclosure to aid in understanding thereof. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION

A user's interaction with a stream, list, feed, or timeline of content, referred to generally as a list of content, may be monitored and additional items content, such as advertising or other paid content, may be inserted into the list at a position based on the user's interaction. Content may include videos (including user-created videos), pictures, audio recordings, text, interactive games, quizzes, or other such content, and may be of any length. In some implementations, an application displaying the list of content, such as a web browser or application, may be configured to automatically play audio or video recordings as they are displayed within a window, e.g. as a user scrolls through the list of content and/or pauses on an audio or video recording.

The additional content, referred to as a second item of content, may be associated with a first item of content in the list based on the interaction. In one implementation, responsive to a user selecting a first item of content or viewing a first item of content for at least a predetermined time period, a second item of content may be selected and inserted into the list and associated with the first item of content for revenue sharing purposes. In another implementation, a direction of scrolling of the list may be monitored, and the second item of content may be inserted into the list in a position subsequent to the first item of content in the direction of scrolling, such that the viewer encounters the second item of content after the associated first item of content. Because the second item of content may be selected to be desirable to viewers of the first item of content, presenting the second item of content subsequent to the first item of content may increase the likelihood of ingestion of the second item of content.

Figure 1A:
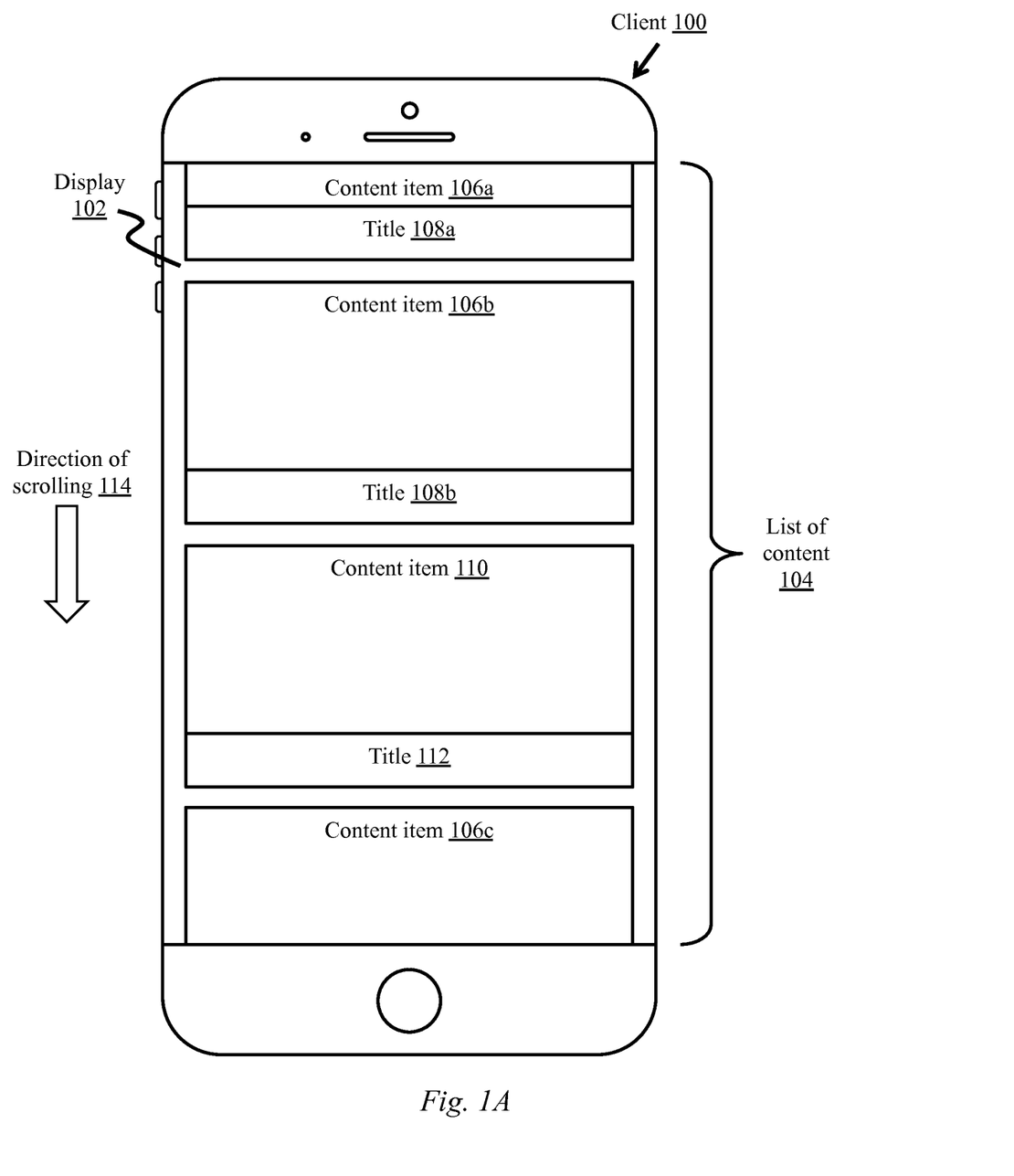
FIG. 1A is an illustration of display of and interaction with a list of content, according to one implementation.

Illustrated in FIG. 1A is one implementation of display of and interaction with a list of content shown on a client 100. Client 100 may comprise a mobile or portable computing device, such as a smart phone, tablet, or wearable computing device. In other implementations, client 100 may comprise a desktop or laptop computer, a workstation computer, or any other type and form of computing device. Client 100 may comprise a display 102, which may, in many implementations, comprise a touch sensitive or multi-touch sensitive display. In other implementations, client 100 may include separate input devices (not illustrated), such as a mouse, keyboard, touch pad, voice command interface, scroll wheel, or any other such input device.

A display 102 may display a list of content 104. The list of content 104 may be displayed by an application, such as a web browser or a stand-alone application, such as a media viewer application, social networking application, or other such application. In many implementations, the list of content 104 may be larger than or extend beyond the display 102, and may be scrolled by a user to view other items of content within the list. Although shown as a vertical one-dimensional list, in some implementations, the list of content 104 may be two-dimensional and referred to as an array of content and allow scrolling in multiple directions. Such an array of content may comprise groups of content arranged in different columns by genre, creator, length, type, date created, or any other such identifier. In still other implementations, the list of content 104 may be three-dimensional, with additional classifications of content provided via depth.

The list of content 104 may include one or more items of content 106a-106c, referred to generally as items of content 106 or first items of content 106. Items of content 106 may comprise any type and form of content, including video and/or audio recordings, pictures, text, animations, interactive games, quizzes, charts, or diagrams. Items of content 106 may be of any length, such as 10 second animations or two hour movies. In many implementations, items of content 106 may be associated with a corresponding title or caption 108a-108c, referred to generally as a title 108. In many implementations, the list of content 104 may display a thumbnail or image representative of an item of content 106, and responsive to the user scrolling the list 104 to fully display the representative thumbnail or image within display 102, the corresponding content item may be loaded and played. The list of content may include still images from videos and as a user scrolls an image completely into display 102, the application may begin playing the video automatically. In some implementations, playback may pause if the user continues scrolling and the content touches the edge of the display 102; or may continue until the content has completely scrolled off of the display 102. In still other implementations, content being played back may be scrolled only within the display 102 and may "stick" or be pinned to an edge of the display, during playback, preventing the user from scrolling the item of content off the display. This may be done with paid items of content to ensure the user views the content. In a further implementation, the user may be allowed to scroll the list of content 104 beneath the paid item of content as it sticks to the edge of the display. In other implementations, the user may be allowed to scroll paid items of content off the display, pausing or skipping playback of the paid item of content. In a further such implementation, the paid item content may be removed from the list responsive to such scrolling off the display.

As discussed above, paid items of content or other such items of content 110 may be inserted into the list of content 104, and appear inserted between items of content 106. In the illustration of FIG. 1A, an item of content 110 has been inserted between a content item 106b and a content item 106c. Items of content 110 may be referred to as second items of content, paid content, interstitial content, inserted content, or by any other such term. In many implementations, an item of content 110 may have an associated title or caption 112, as shown. As with items of content 106, items of content 110 may comprise any type and form of content, including video and/or audio recordings, pictures, text, animations, interactive games, quizzes or surveys, charts, diagrams, engagement advertisements, social advertisements, search advertisements, carousel advertisements, or application installation advertisements. Similarly, as discussed above, items of content 110 may be displayed as thumbnails or static images and/or may be automatically played subsequent to playback of an associated item of content 106. In some implementations, a user may select an item of content 110 to load an associated web page in a web browser or other application, or may flag the item of content 110 for subsequent review and loading of associated web pages.

As shown, a user may scroll the list of content 104 to view different content items 106 in a direction of scrolling 114. Although shown pointing downwards, as discussed above, in many implementations, the user may scroll either upwards or downwards, or in some implementations, left or right and/or forwards and backwards in a z-plane. Accordingly, the direction of scrolling 114 may refer to a present or most recent direction of scrolling. In the illustration of FIG. 1A, the user has scrolled the list of content 104 downwards, such that content item 106a is almost completely moved off the top of the display 102 and content item 106c has appeared at the bottom of the display 102. Responsive to the direction of scrolling 114, a content item 110 (and associated title 112) has been inserted into the list of content 104 subsequent to content item 106b (and associated title 108b) as shown. As discussed above, content item 110 may be inserted into the list responsive to the user scrolling through the list 104 and pausing to view content item 106b, and accordingly, is inserted at a position subsequent to content item 106b in the direction of scrolling 114. Conversely, if the user had been scrolling upwards and paused on content item 106b, in such implementations, content item 110 would be inserted into the list between content item 106a and content item 106b. In some implementations, the direction of scrolling may be considered a parameter-value pair (e.g. "scrolling-upwards" or via similar identifiers) and may be transmitted in requests and/or responses or stored in memory as such. In other implementations, the direction of scrolling may be identified via a bit or flag set to a predetermined value for a location. In still other implementations, the direction of scrolling may be identified via a vector, with a length identifying a speed or rate of scrolling.

Figure 1B:
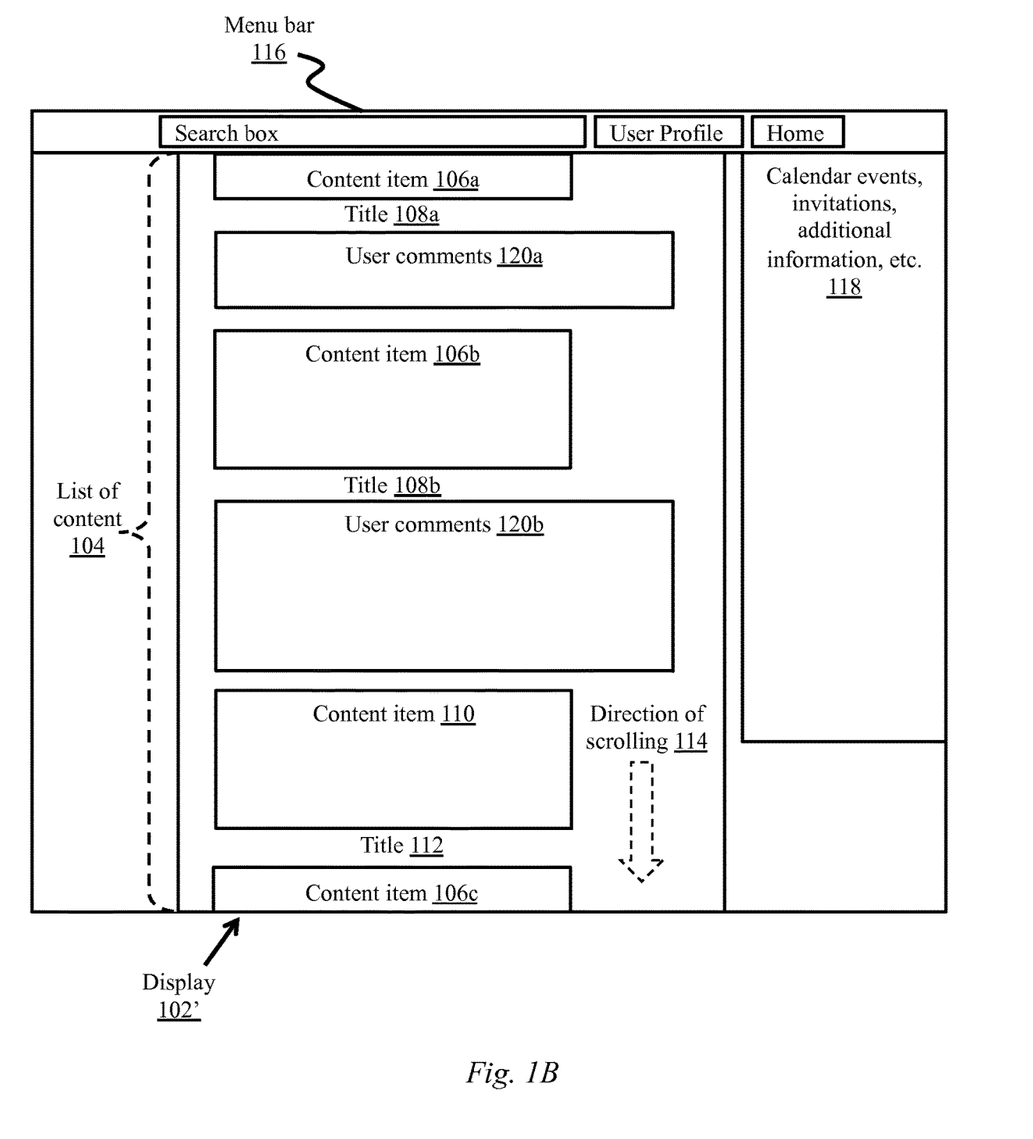
FIG. 1B is another illustration of display of and interaction with a list of content, according to one implementation.

Referring briefly to FIG. 1B, illustrated is another implementation of a display 102' showing a list of content 104. Display 102' may comprise an application window, such as a window of a web browser, social networking application, or other such application, a full screen window, or any other such display. Display 102' may be presented by a computing device, such as a desktop computer, laptop computer, tablet computer, smart phone, wearable computer, or any other type and form of computing device. In some implementations, as shown, a display 102' may include a menu bar 116, which may comprise fields or user interface items for searching for content or other users, viewing user profiles, etc. Display 102' may also include a sub-frame 118 or display of calendar events, invitations, additional information or content, as well as other such features. Although shown scrolling vertically as in FIG. 1A, the list of content 104 may scroll horizontally, or may be a two or three dimensional array and scroll vertically, horizontally, and/or forwards and backwards in a z-plane. In some implementations, as shown in FIG. 1B, each content item 106a may be further associated with one or more user comments 120a-120b, referred to generally as comments 120. Comments 120 may be submitted by the user or other users viewing the corresponding item of content, and may be displayed in full, truncated, linked, or otherwise shown. As shown in FIG. 1B and similar to FIG. 1A, a content item 110 may be inserted into the list of content 104 in a position subsequent to a content item 106 (and associated title 108 and/or comments 120) in a direction of scrolling 114, responsive to interaction with the content item 106.

A direction of scrolling 114 may refer to a direction in which a visible portion of the list of content 104 shown within display 102, 102' moves across the list, rather than a direction of user interaction with the list, which may be variable dependent on operating system or application configuration. In one implementation, a user may move a scroll bar downwards, while in another implementation, the user may swipe a finger upwards on the list, with both interactions resulting in the display showing a portion of the list further down the list, or scrolling the list downwards.

Figure 1C:
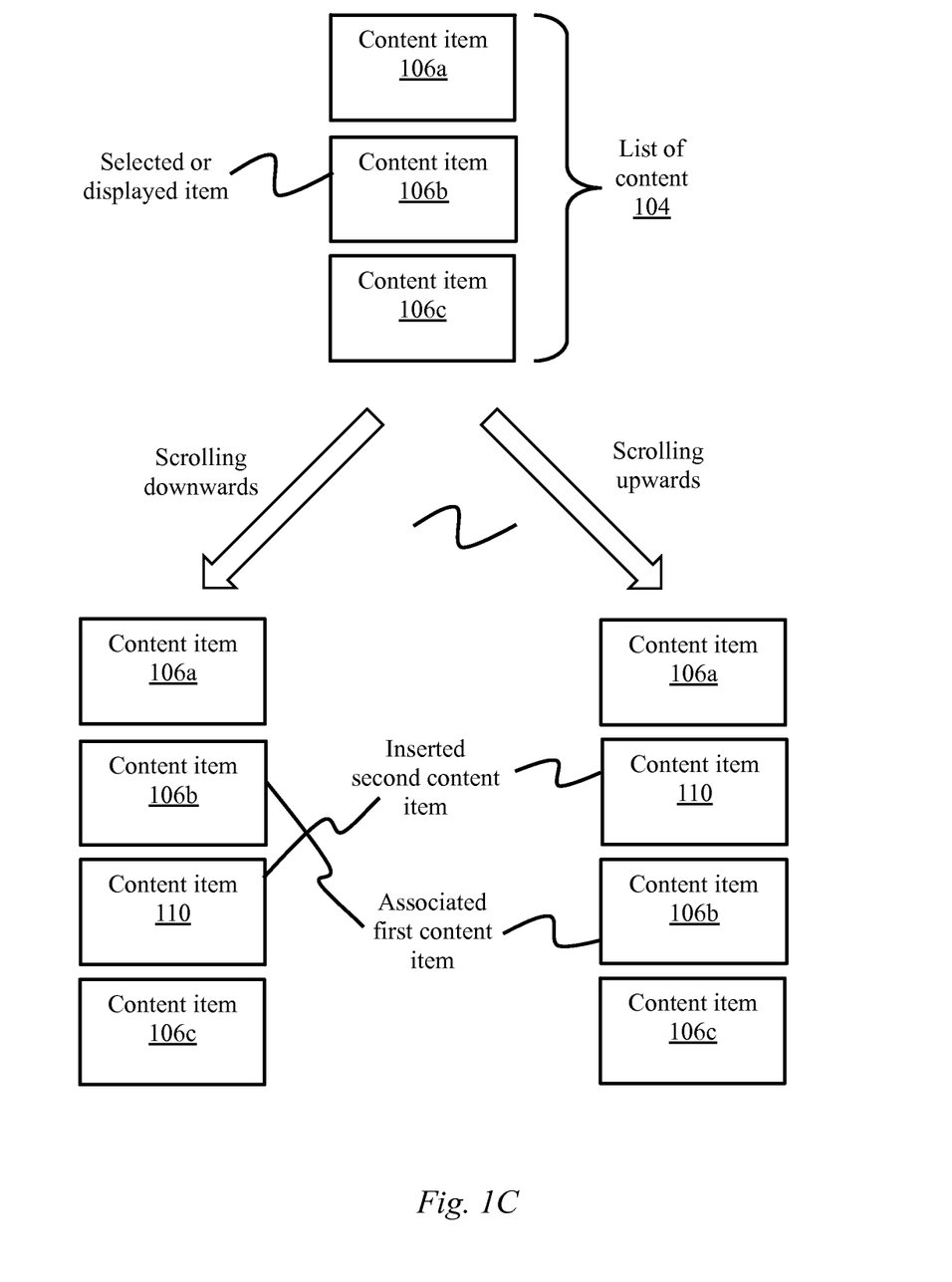
FIG. 1C is a diagram illustrating insertion of items of content into a list of content responsive to interaction with the list, according to one implementation.

As discussed above, a content item 106 in the list of content 104 may be associated with the inserted item of content 110. This association may be used for revenue sharing, audience measurement, or other such purposes, as well as personalized selection of content 110 based on one or more characteristics of content item 106 (e.g. genre, keywords, subject, etc.). Similarly, as discussed above, content item 110 may be inserted in a position subsequent to the associated content item 106, such that the inserted item is "next" or appears after the related content item 106. In many implementations, content item 110 may be inserted to appear immediately subsequent to the associated content item 106, while in other implementations, content item 110 may be inserted farther along in the list, responsive to an average speed of scrolling of the list or an average rate of user interaction with the list. As used herein, both positions immediately subsequent to the associated content item and farther along in the list in the same direction may be referred to as subsequent or adjacent positions in the list. Referring briefly to FIG. 1C, illustrated is a diagram of insertion of a content item 110 in a list subsequent to an associated content item 106b in a direction of scrolling. As shown, the list of content 104 may initially include content 106a-106c. Responsive to an interaction, selection, or display of content item 106b, a content item 110 may be selected for insertion into the list 104. If the user is or has most recently scrolled the list downward (e.g. with the display moving from content item 106a to content item 106b), then content item 110 may be inserted between content item 106b and content item 106c. Conversely, if the user is or has most recently scrolled the list upward (e.g. with the display moving from content item 106c to content item 106b), then content item 110 may be inserted between content item 106b and content item 106a, as shown. Horizontal scrolling, as well as two or three-dimensional scrolling may also be considered, with the content item 110 inserted at a position along a vector of the most recent scrolling direction.

Figure 2A:
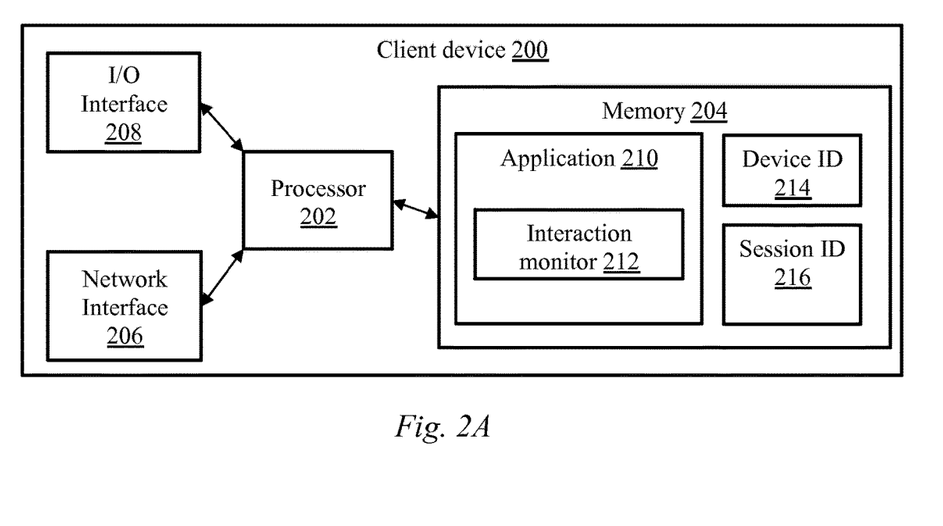
FIG. 2A is a block diagram of a client device, according to one implementation.

Illustrated in FIG. 2A is a block diagram of one implementation of a computing device 200 of a client, such as client 100 or a device providing a display 102, 102'. Client device 200 may be any number of different types of user electronic devices configured to communicate via a network, including without limitation, a laptop computer, a desktop computer, a tablet computer, a smartphone, a digital video recorder, a set-top box for a television, a video game console, or any other type and form of computing device or combinations of devices. In some implementations, the type of client device 200 may be categorized as a mobile device, a desktop device or a device intended to remain stationary or configured to primarily access a network via a local area network, or another category of electronic devices such as a media consumption device.

In many implementations, client device 200 includes a processor 202 and a memory 204. Memory 204 may store machine instructions that, when executed by processor 202 cause processor 202 to perform one or more of the operations described herein. Processor 202 may include a microprocessor, ASIC, FPGA, etc., or combinations thereof. In many implementations, processor 202 may be a multi-core processor or an array of processors. Memory 202 may include, but is not limited to, electronic, optical, magnetic, or any other storage devices capable of providing processor 202 with program instructions. Memory 202 may include a floppy disk, CD-ROM, DVD, magnetic disk, memory chip, ROM, RAM, EEPROM, EPROM, flash memory, optical media, or any other suitable memory from which processor 202 can read instructions. The instructions may include code from any suitable computer programming language such as, but not limited to, C, C++, C #, Java, JavaScript, Perl, HTML, XML, Python and Visual Basic.

Client device 200 may include one or more network interfaces 206. A network interface 206 may include any type and form of interface, including Ethernet including 10 Base T, 100 Base T, or 1000 Base T ("Gigabit"); any of the varieties of 802.11 wireless, such as 802.11a, 802.11b, 802.11g, 802.11n, or 802.11ac; cellular, including CDMA, LTE, 3G, or 4G cellular; Bluetooth or other short range wireless connections; or any combination of these or other interfaces for communicating with a network or other computing devices. In many implementations, client device 200 may include a plurality of network interfaces 206 of different types, allowing for connections to a variety of networks, such as local area networks or wide area networks including the Internet, via different sub-networks.

Client device 200 may include one or more user interface or input/output devices 208. A user interface device 208 may be any electronic device that conveys data to a user by generating sensory information (e.g., a visualization on a display 102, 102', one or more sounds, tactile feedback, etc.) and/or converts received sensory information from a user into electronic signals (e.g., a keyboard, a mouse, a pointing device, a touch screen display, a microphone, etc.). The one or more user interface devices may be internal to the housing of client device 200, such as a built-in display, touch screen, microphone, etc., or external to the housing of client device 200, such as a monitor connected to client device 200, a speaker connected to client device 200, etc., according to various implementations.

Client device 200 may include in memory 204 an application 210 or may execute an application 210 with a processor 202. Application 210 may be an application, applet, script, service, daemon, routine, or other executable logic for receiving content and for transmitting responses, commands, or other data. In one implementation, application 210 may be a web browser, while in another implementation, application 210 may be media presentation application. Application 210 may include functionality for displaying content received via network interface 206 and/or generated locally by processor 202, and for transmitting interactions received via a user interface device 208, such as requests for websites, selections of survey response options, input text strings, etc.

In some implementations, application 210 may include an interaction monitor 212. An interaction monitor 212 may include an application plug-in, application extension, subroutine, browser toolbar, daemon, or other executable logic for collecting data processed by application 210 and/or monitoring interactions of a user with an interface 208. In other implementations, an interaction monitor 212 may be a separate application, service, daemon, routine, or other executable logic separate from application 210 but configured for intercepting and/or collecting data processed by application 210, such as a screen scraper, packet interceptor, API hooking process, or other such application. Interaction monitor 212 may be configured for intercepting or receiving data input via user interface device 208, including mouse clicks, scroll wheel movements, gestures such as swipes, pinches, or touches, or any other such interactions; as well as data received and processed by application 210 including content displayed or media played, duration of playback, as well as interactions with playback controls including pausing, resetting or restarting, fast forwarding, muting, or any other such interactions. Interaction monitor 212 may identify streamed multimedia content received by a client device, such as a television show, movie, song, music video, or other such content. Content may be identified based on identifier tags including ID3 tags or other such metadata, uniform resource locators (URLs) or uniform resource identifiers (URIs), filenames, captions, titles, or any other type and form of data accompanying the content.

Client 200 may include or be identified with a device identifier 214. Device identifier 214 may include any type and form of identification, including without limitation a MAC address, text and/or numerical data string, a username, a cryptographic public key, cookies, device serial numbers, user profile data, network addresses, or any other such identifier that may be used to distinguish the client 200 from other clients 200. In some implementations, a device identifier 214 may be associated with one or more other device identifiers 214 (e.g., a device identifier for a mobile device, a device identifier for a home computer, etc.). In many implementations, to preserve privacy, the device identifier 214 may be cryptographically generated, encrypted, or otherwise obfuscated. In some implementations, client 200 may include a session identifier 216, which may be similar to a device identifier 214 but generated more frequently, such as hourly, daily, upon activation of application 210, or any other such period. Session identifiers 216 may be generated by a client device 200 or received from a server, content provider, or other device. Session identifiers 216 may be used in place of device identifiers 214 to increase anonymity, or may be used in connection with device identifiers 214 to distinguish interactions of one session from those of another session.

Figure 2B:
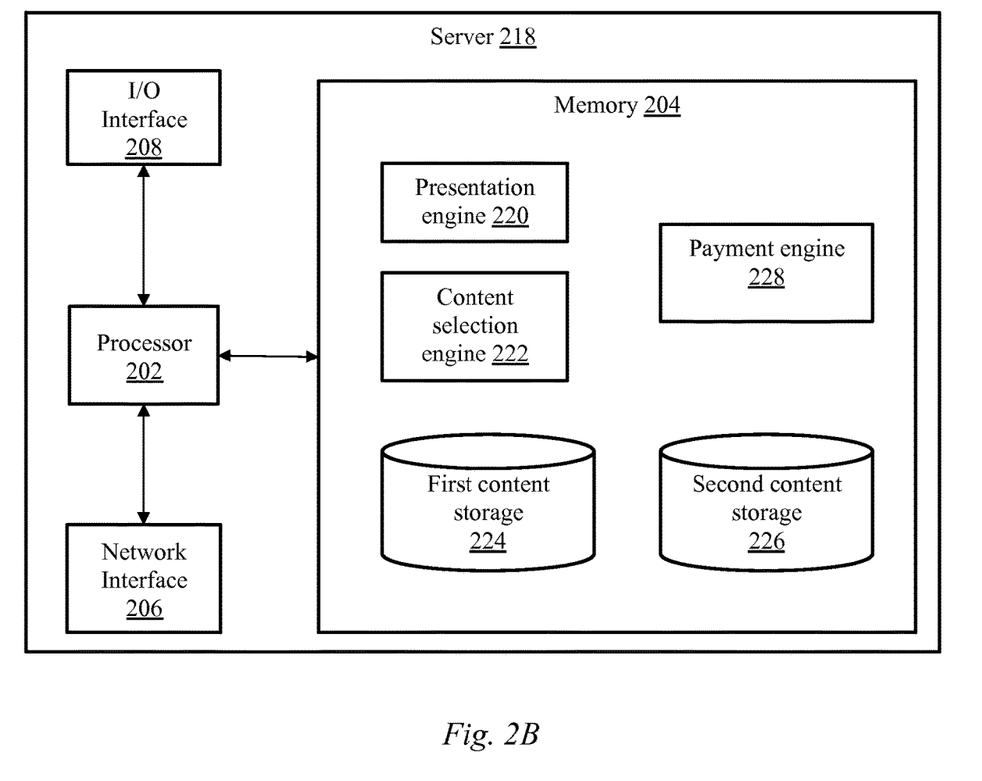
FIG. 2B is a block diagram of a server device, according to one implementation.

Referring now to FIG. 2B, illustrated is a block diagram of an implementation of a computing device or server 218, such as a content provider. As with client devices 200, server 218 may include one or more processors 202, memories 204, network interfaces 206, and user interfaces 208. In some implementations referred to as headless servers, a server 218 may not include a user interface 208, but may communicate with clients 200 with user interfaces 208 via a network. Memory 204 may include first content storage 224 for storing content for inclusion in a list 104, such as storage of webpages, images, audio files, video files, data files, or any other type and form of data. Memory 204 may also include second content storage 224 for storing content to be inserted, responsive to detected interactions, into a list 104 populated with content from first content storage 224. In some implementations, memory 204 may store one or more applications 210 (not illustrated) for execution by processor 202 of the server 218, including FTP servers, web servers, mail servers, file sharing servers, peer to peer servers, or other such applications for delivering content stored in content storage 224, 226.

In some implementations, a server 218 may execute a presentation engine 220. Presentation engine 220 may comprise an application, service, server, daemon, routine, or other executable logic for presenting or providing a list of items of content to a client device, including content identifiers. In some implementations, presentation engine 220 may select one or more items of content from first content storage 224 responsive to a request for a list of content received from a client device. Such requests may include identifiers of content to be included in the list, including keywords, creator names, genres, types, etc. Presentation engine 220 may retrieve identifications of corresponding first items of content and assemble the list for transmission to client device 200. In some implementations, the list may be assembled as an XML file or HTML file, while in other implementations, the list may be assembled in any other encoding type or format for interpretation by an application on client device 200. Presentation engine 220 may, in some implementations, receive identifications of one or more second items of content to be included in a list and identifications of corresponding one or more first items of content currently in the list and associated with the selected one or more second items of content, and regenerate or modify the list to include the identified one or more second items of content at positions subsequent to the corresponding one or more first items of content in a direction of scrolling of the list. In other implementations, identifications of the second item of content and corresponding first item of content may be transmitted to client device 200. Application 210 and/or interaction monitor 212 may modify a previously-received list 104 to include the received identification of the second item of content at a position subsequent to the corresponding first item of content in the direction of scrolling. This may reduce processing requirements on server 218 and the need to retransmit the entire list for display, as well as reducing data required to be sent to server 218. In one such implementation, responsive to detecting an interaction with a first item of content, application 210 may request a second item of content for inclusion in the list from server 218, the request including an identification of the first item of content. The server 218 may select a second item of content based on characteristics of the first item of content, and transmit a response identifying the second item of content to the client 200. The application 210 may then modify the list to include the identification of the second item of content in a position subsequent in a direction of scrolling to the first item of content. Accordingly, such modification functions may be performed by application 210 rather than presentation engine 220 in such implementations.

In some implementations, server 218 may execute a content selection engine 222. A content selection engine 222 may comprise an application, service, routine, server, daemon, or other executable logic for selecting content from first content storage 224 and/or second content storage 226 responsive to a request comprising one or more identifiers. A request for a list of content may include a device identifier, user identifier, session identifier, keyword, genre, type, creator, creation date, unwatched flag, or any other type and form of identification or characteristic. Content selection engine 222 may identify one or more items of content in first content storage 224 matching the characteristics or identifiers in the request, and may provide the identifications to presentation engine 220 for inclusion in the generated list. In some implementations, content selection engine 222 may limit the number of identified items of content, returning 10, 20, 50 or any other predetermined number of items. Content selection engine 222 may similarly select an item of content from second content storage 226 responsive to a request from a client generated upon detection of an interaction with a first item of content displayed by an application of the client. Content selection engine 222 may select an item of content from content storage 226 based on one or more characteristics of the first item of content including genre, type, title, keywords, creator, creation date, or any other such information. In one implementation, a first item of content may be a brief video about a sporting event. Content selection engine 222 may select a second item of content related to the sport for inclusion in the list, with viewers of the first item of content likely to be interested in the second item of content.

In some implementations, a server 218 may execute a payment engine 228. Payment engine 228 may comprise an application, service, server, daemon, routine, or other executable logic for associating a creator, publisher, distributor, or sponsor of a first item of content with a paid second item of content inserted into a list responsive to a detected interaction with the first item of content. Payment engine 228 may provide revenue sharing from creators or publishers of paid content, such as advertising, to creators of popular first items of content that draw viewers, and/or indicate to a third-party payment system to provide payments and/or revenue sharing for such interactions. In some implementations, payment engine 228 may maintain a record or log of which items of content were interacted with, device identifiers of clients that interacted with the items, second items of content that were provided for inclusion in displayed lists, identifications of whether the second items of content were interacted with, etc.

Figure 3A:
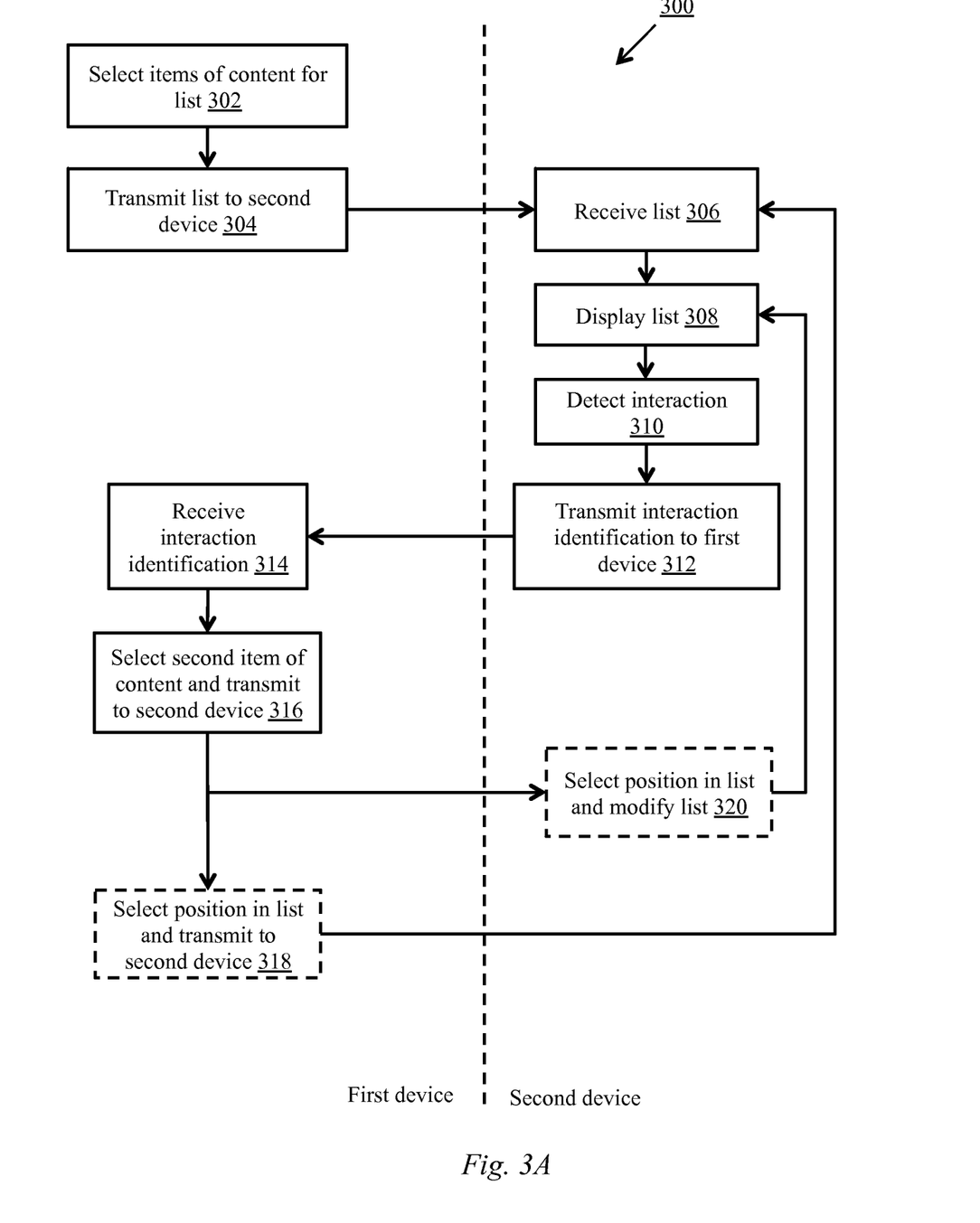
FIG. 3A is a flow diagram of the steps taken in one implementation of a process for selective insertion of content into a list of items of content.

FIG. 3A is a flow chart of one implementation of a method 300 for selective insertion of additional content into a list of items of content. As shown, a portion of method 300 may be performed by a first device, such as a content provider, while a second portion of method 300 may be performed by a second device, such as a client device. In other implementations, the method may be divided differently than illustrated, with a greater or fewer number of steps performed by each device, or with steps performed by other devices not illustrated.

At step 302, a first device may select one or more items of content for inclusion in a list. In some implementations, the first device may select the one or more items of content responsive to a request from a client device, such as a request for content matching a keyword, from a particular content creator or group of creators, matching a genre, content created within a recent time period, or any other such characteristics. As discussed above, in some implementations, the first device may limit the number of results to a predetermined number, such as 10, 20, 50, or any other number of results, to reduce bandwidth, memory, and processor requirements. A list of content may be generated to include identifications of the selected items, and, at step 304, the list may be transmitted to a second device. The list may include an identification of each item of content, such as a uniform resource identifier (URI) of the item of content; a uniform resource locator (URL) or address from which the item of content may be retrieved; a URL or address from which a thumbnail or static image representative of the content may be retrieved; a title or caption of the item of content; one or more comments from other users that have viewed the item of content; a size of the item of content; a type of the item of content; and/or any other information about each item of content. The list may be an XML list, an HTML file including the list, a database, a flat file, or any other type and form of data.

At step 306, the second device may receive the list. The list may be received via any type and form of network, such as the Internet, and may be cached in memory and/or executed or interpreted by an application executed by the second device, such as a browser or media display application. At step 308, the list may be displayed. In some implementations, a portion of the list may be displayed, such as identifications of a first few items of content of the list. Display of the list may comprise display of static images or thumbnails of pictures or videos, which may be retrieved separately or generated by the second device. The second device may receive the list and request thumbnails representative of content in the list, based on identified locations for the thumbnails in the list data. The thumbnails may be cached and displayed by the application, with content retrieved in the background and cached or retrieved dynamically in response to interaction by a user with the content.

Figure 3B:
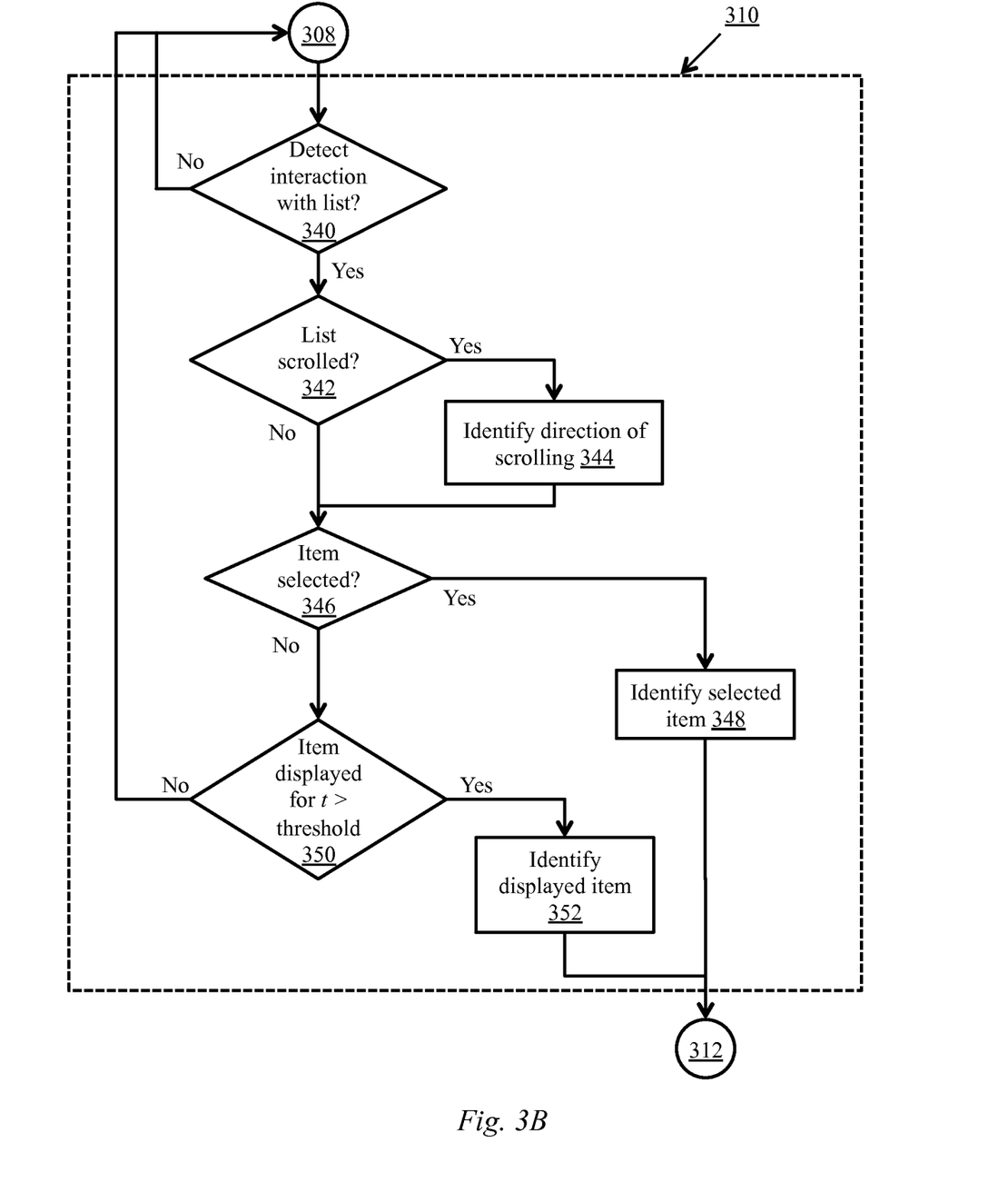
FIGS. 3B and 3C are flow diagrams showing steps of the flow diagram of FIG. 3A in greater detail, according to one implementation.

At step 310, the device may detect an interaction with an item of content. Interactions may include selecting an item of content (e.g. clicking on the item of content, flagging the item of content for subsequent review, selecting a "like" button for the item of content, commenting on the item of content, sharing or sending a referral link to the item of content to another user, pausing on the item of content during scrolling of the list of items of content such that the item of content is automatically played back for more than a predetermined time period, etc.). Referring briefly to FIG. 3B, illustrated are additional steps that may be performed during an implementation of step 310. At step 340, the application or device may determine whether the user has interacted with the list or item of content. The determination may be performed based on commands from an input device, an API call from the application or operating system, or any other such data.

If no interaction has been detected, then the method may return to step 308. If an interaction was detected, then the device may determine at step 342 if the interaction included scrolling the list and/or whether the list was previously scrolled prior to the detected interaction. As discussed above, the list may be scrolled via a scroll box, directional button, scroll wheel, touch gesture, voice command, or any other such interaction. If the list was scrolled, then at step 344, the device may determine a direction of scrolling of the list. In many implementations, direction of scrolling may be explicitly determined from an API call generated during scrolling. A scrolling gesture may be received by an operating system, which may generate an API call to the application displaying the list indicating to scroll the list in a specified direction at a specified rate or velocity. In some implementations, no scrolling will have been detected, such as if the user interacts with the first item of content displayed in the list. In such implementations, a default direction of scrolling may be selected. If the first item displayed is at one end of the list, a default direction of scrolling may be selected to be away from the end of the list. In other implementations, the first item displayed may be in the middle of a list, with the user able to scroll in either direction. In such implementations, a default of direction may be selected, such as downwards or rightwards.

At step 346, the device may determine whether an item of content was selected. Selection of the item of content may include clicking on the item of content, flagging the item of content for subsequent review, selecting a "like" button for the item of content, commenting on the item of content, sharing or sending a referral link to the item of content to another user, or otherwise explicitly selecting the content. In one implementation, the content item may comprise a quiz or survey, and selection of an answer may be an explicit selection of the item. If an item of content was selected, then the selected item may be identified at step 348 for generation of a request for a second item of content. In some implementations, the method may proceed to step 312 of FIG. 3A.

If an item of content was not explicitly selected, then at step 350, if an item of content is displayed for a time t greater than a predetermined threshold, the item of content may be identified as interacted with. As discussed above, in many implementations, content items may be static images or text that the user may pause on while scrolling through the list, while in other implementations, content items may be video or audio recordings set to automatically playback when displayed to the user. Pausing on such items for greater than a predetermined threshold of time may indicate that the user viewed the content item. The threshold may be dynamically set based on characteristics of the content: if the content is a static image, a first, short threshold may be set, such as 2 or 3 seconds. If the content is a 10 second video, a threshold may be set at 5 seconds. If the content is a half hour video program, the threshold may be set at one minute, five minutes, or any other such time. If the content is text, the threshold may be set to be proportional to the length of the text or number of words in the text (e.g. 1 second per five words, or any other such values). Thresholds may be selected to reduce false positive results that erroneously indicate interest by the user. At step 352, if the content has been identified as interacted with, the device may identify the displayed item of content. Identifying the item of content may comprise retrieving a URI or title of the content item from the list. The method may then proceed to step 312 of FIG. 3A.

Returning to FIG. 3A, at step 312, the device may transmit the identification of the selected or displayed item of content (e.g. steps 348, 352) to the first device in a request for a second item of content. In some implementations, the request may include the identified or default direction of scrolling, while in other implementations, the second device may retain the scrolling direction and select a position for the second item of content with the list upon receipt from the first device, as discussed above. In still other implementations, the device may transmit a characteristic (e.g. genre, type, creator, etc.) of the selected or displayed item of content to the first device in the request, but may not explicitly identify the item of content. This may be done to increase anonymity and privacy, while still providing sufficient information for the first device to select a second item of content. In some such implementations, a publisher or source of the first item of content may be identified via the request such that revenue from a provider of the second item of content may be shared with the publisher or content source.

At step 314, the first device may receive the request for the second item of content, the request identifying the first item of content, characteristics of the first item of content, and/or scrolling direction of the list. At step 316, the first device may select a second item of content based on the data in the request. As discussed above, in some implementations, a content selection engine executed by the first device may retrieve one or more characteristics of the first item of content and search in a database for a second item of content having corresponding values for the one or more characteristics, such as a matching genre, keyword, creator, etc. In other implementations, the content selection engine may receive the characteristics from the second device and may search in the database for the second item of content having corresponding values. The first device may transmit an identification of the second item of content in response to the request, such identification including a title of the second item of content; a URI of the second item of content; a URL or address from which the second item of content may be retrieved; a URL or address from which a thumbnail or static image representative of the second item of content may be retrieved; a title or caption of the second item of content; one or more comments from other users that have viewed the second item of content; a size of the second item of content; a type of the second item of content; and/or any other information about the second item of content.

As discussed above, in some implementations, at step 318, the first device may select a position in the list based on the received identification of scrolling of the list, and may modify the list to include the second item of content at a position subsequent to the first item of content in the direction of scrolling. The modified or updated list may be transmitted to the second device for display. In some implementations in which the second device displays the list via a web browser, the list may be updated on the server and transmit the updated list to the client for display than to modify the displayed page on the client.

In other implementations, at step 320, the second device may select a position in the list based on the received identification of scrolling of the list, and may modify the list to include the second item of content at a position subsequent to the first item of content in the direction of scrolling. As discussed above, such implementations do not require transmission of the direction of scrolling to the server, and may require less processing and bandwidth on the part of the server. As discussed above, in some implementations of steps 318 and 320, the selected position in the list for insertion of the second item of content may be immediately subsequent to the first item of content, or may be displaced from the first item of content by one or more entries, such as based on a rate of scrolling of the list.

Figure 3C:
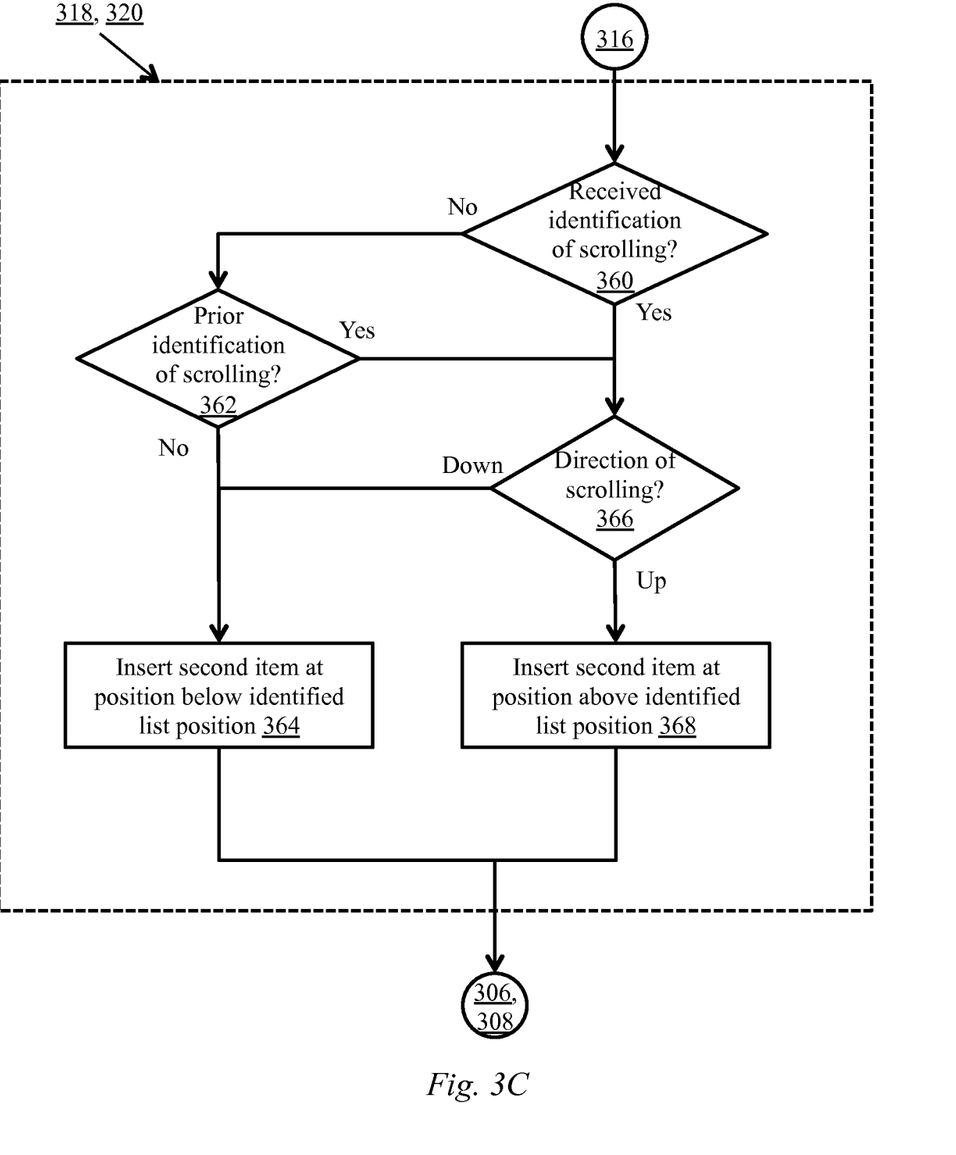

Referring briefly to FIG. 3C, illustrated is an implementation of position selection of steps 318 and 320 in more detail. At step 360, in some implementations, the first device in step 318 or second device in step 320 may determine if a present direction of scrolling has been identified in the request or as part of the identified interaction with the first item of content. As discussed above, in many implementations, the identified interaction may include an explicit selection of or interaction with the first item of content, or an implicit interaction with an item of content such as viewing it for a time period greater than a threshold. Accordingly, a scrolling interaction with the list may have occurred sometime earlier. Such interactions may be logged or monitored, such that at step 362, the device may determine if a scrolling interaction was detected prior to interaction with the first item of content. If not (e.g. if the first item of content was the first item in the list), then at step 364, a position in the list may be selected for the second item of content subsequent to the first item of content in a default direction, such as down or to the right in the list or in a direction away from the nearest edge of the list. Conversely, if a scrolling direction is received at step 360 or was previously identified at step 362, then the direction of scrolling may be used to select the position for the second item of content at step 366. If the scrolling was downwards, then at step 364, a position in the list may be selected for the second item of content subsequent to the first item of content in a downwards direction. If the scrolling was upwards, then at step 368, a position in the list may be selected for the second item of content subsequent to the first item of content in an upwards direction. Similar steps may be applied for scrolling interactions to the right or left or forwards or backwards in a z-plane. The second item of content or an identifier for the second item of content (link, thumbnail, static image, etc.) may be inserted into the list at the selected position, and the list may be transmitted to the second device after step 318, or the displayed list may be updated or modified after step 320, as discussed above.

Accordingly, the systems and methods discussed herein provide dynamic monitoring of interaction of a user with a list of content items, including automatically playing media, and insertion of paid content items at positions selected responsive to the interactions of the user, such that the user may be more likely to view the paid content. These systems further provide for association of inserted paid content with original content creators, allowing for incentivization of creation of popular content through revenue sharing or similar models.

In many implementations, data collected about a user may be anonymized or disambiguated to protect privacy. In many implementations in which personal information about the user of client device may be collected for measurement or used to select third-party content, the user may be provided with an opportunity to control whether programs or features that may collect personal information (e.g., information about a user's social network, social actions or activities, a user's preferences, or a user's current location) do so, or an opportunity to control whether or how to transmit measurement data to an audience measurement server and/or panel provider. In addition, certain data may be treated in one or more ways before it is stored or used by an audience measurement server, so that personally identifiable information is removed when generating parameters (e.g., demographic parameters). A user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by the audience measurement servers, panel providers, and content providers.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including a programmable processor, a computer, a system on a chip, or multiple ones or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Communication networks can include various combinations of a local area network ("LAN"), a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). Client devices receiving content and providing relay pings, identifiers, or other data to an audience measurement service and/or panel provider may be smart television modules. The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method for selectively inserting an item of content into a list, comprising:
    displaying, by a device, a list of items of content within an application window, the list of items of content including a plurality of items of content;
    detecting, by the device, a scrolling interaction with the list of items of content within the application window, the scrolling interaction associated with a parameter and value of the parameter, the value of the parameter corresponding to a direction of scrolling;
    identifying, by the device, responsive to detecting the scrolling interaction, a first item of content from the list of items of content based on a first position of the first item of content within the application window;
    determining, by the device, that a length of time that the first item of content was displayed within the application window prior to the scrolling interaction satisfies a threshold length of time;
    attributing, by the device, the scrolling interaction to the first item of content from the list of items of content responsive to determining that the length of time of the first item of content satisfies the threshold length of time;
    generating, by the device, responsive to the scrolling interaction, a request for content to insert into the list of items of content, the request including a first content identifier of the first item of content, the first content identifier selected to be included in the request for content based on determining that the length of time that the first item of content was displayed within the application window prior to the scrolling interaction satisfies the threshold length of time;
    transmitting, by the device, to one or more servers, the request for content to insert into the list of items of content;
    receiving, by the device, from the one or more servers for insertion into the list of items of content within the application window, a second content identifier of a second item of content, the second item of content selected by the one or more servers based on a characteristic of the first item of content;
    selecting, by the device, from a plurality of a predetermined positions, a position within the list of items of content for the second item of content, based on the direction of scrolling corresponding to the value of the parameter in one of a first direction or a second direction; and
    modifying, by the device, responsive to receiving the second content identifier from the one or more servers and selecting the position, the plurality of items of content of the list of items of content within the application window by inserting, for display within the application window, the second content identifier of the second item of content into the list.

2. The method of claim 1, wherein detecting the scrolling interaction further comprises detecting the scrolling interaction with the list of items of content in the direction of scrolling, the value of the parameter comprising a predetermined value corresponding to the direction of scrolling;
    wherein selecting the position within the list for the second item of content further comprises selecting the position of the plurality of the predetermined positions subsequent to the first item of content in the direction of scrolling according to the value of the parameter; and
    wherein inserting the second item of content into the list further comprises inserting the second item of content into the list subsequent to the first item of content in the direction of scrolling.

3. The method of claim 1, further comprising associating, by the device, the display of the second item of content with a provider of the first item of content.

4. The method of claim 1, wherein detecting the scrolling interaction with the first item of content in the list of items of content further comprises detecting a selection of the first item of content.

5. The method of claim 1, further comprising setting the threshold length of time, by the device, responsive to a type or length of the first item of content.

6. The method of claim 5, further comprising setting the threshold length of time to a predetermined percentage of the length of the first item of content.

7. The method of claim 1, wherein displaying the list of items of content further comprises determining that a portion of the list identifying the first item of content is fully displayed by the device; and automatically displaying the first item of content, responsive to the determining.

8. The method of claim 1, further comprising automatically displaying the second item of content subsequent to the display of the first item of content.

9. A system for selectively inserting an item of content into a list, comprising:
    a device, comprising a display device, an input device, and a processor executing a content position selection engine;
    wherein the display device is configured to display a list of items of content within an application window, the list of items of content including a plurality of items of content; and wherein the device is configured to:
  detect, via the input device, a scrolling interaction with the list of items of content within the application window, the scrolling interaction associated with a parameter and a value of the parameter, the value of the parameter corresponding to a direction of scrolling,
  identify, responsive to detecting the scrolling interaction, a first item of content from the list of items of content based on a first position of the first item of content within the application window;
  determine that a length of time that the first item of content was displayed within the application window prior to the scrolling interaction satisfies a threshold length of time;
  attribute the scrolling interaction to the first item of content from the list of items of content responsive to determining that the length of time of the first item of content satisfies the threshold length of time;
  generate, responsive to the scrolling interaction, a request for content to insert into the list of items of content, the request including a first content identifier of the first item of content, the first content identifier selected to be included in the request for content based on determining that the length of time that the first item of content was displayed within the application window prior to the scrolling interaction satisfies the threshold length of time;
  transmit to one or more servers, the request for content to insert into the list of items of content;
  receive, from the one or more servers for insertion into the list of items of content within the application window, a second content identifier of a second item of content, the second item of content selected by the one or more servers based on a characteristic of the first item of content;
  select, from a plurality of predetermined positions, a position within the list of items of content for the second item of content, based on the direction of scrolling corresponding to the value of the parameter in one of a first direction or a second direction; and
  modify, responsive to receiving the second content identifier from the one or more servers and selecting the position, the plurality of items of content of the list of items of content within the application window by inserting, for the display within the application window, the second content identifier of the second item of content into the list.

10. The system of claim 9, wherein the device is configured to detect the scrolling interaction with the list of items of content in the direction of scrolling, the value of the parameter comprising a predetermined value corresponding to the direction of scrolling;
  and wherein the content position selection engine selects the position of the plurality of predetermined positions subsequent to the first item of content in the direction of scrolling according to the value of the parameter;
  the second item of content inserted into the list subsequent to the first item of content in the direction of scrolling.

11. The system of claim 9, wherein the device is further configured to associate the display of the second item of content with a provider of the first item of content.

12. The system of claim 9, wherein the device is further configured to detect a selection of the first item of content.

13. The system of claim 9, wherein the device is further configured to set the threshold length of time, responsive to a type or length of the first item of content.

14. The system of claim 13, wherein the device is further configured to set the threshold length of time to a predetermined percentage of the length of the first item of content.

15. The system of claim 9, wherein the device is further configured to determine that a portion of the list identifying the first item of content is fully displayed by the device; and automate the display the first item of content, responsive to the determining.

16. The system of claim 9, wherein the device is further configured to automate the display the second item of content subsequent to the display of the first item of content.

17. A non-transitory computer-readable storage medium storing instructions that when executed by one or more data processors, cause the one or more data processors to perform operations including:
  displaying a list of items of content within an application window, the list of items of content including a plurality of items of content;
  detecting a scrolling interaction with the list of items of content within the application window, the scrolling interaction associated with a parameter and a value of the parameter, the value of the parameter corresponding to a direction of scrolling;
  identifying, responsive to detecting the scrolling interaction, a first item of content from the list of items of content based on a first position of the first item of content within the application window;
  determining that a length of time that the first item of content was displayed within the application window prior to the scrolling interaction satisfies a threshold length of time;
  attributing the scrolling interaction to the first item of content from the list of items of content responsive to determining that the length of time of the first item of content satisfies the threshold length of time;
  generating, responsive to the scrolling interaction, a request for content to insert into the list of items of content, the request including a first content identifier of the first item of content, the first content identifier selected to be included in the request for content based on determining that the length of time that the first item of content was displayed within the application window prior to the scrolling interaction satisfies the threshold length of time;
  transmitting to one or more servers, the request for content to insert into the list of items of content;
  receiving, from the one or more servers for insertion into the list of items of content within the application window, a second content identifier of a second item of content, the second item of content selected by the one or more servers based on a characteristic the first item of content;
  selecting, from a plurality of a predetermined positions, a position within the list of items of content for the second item of content, based on the direction of scrolling corresponding to the value of the parameter in one of a first direction or a second direction; and
  modifying, responsive to receiving the second content identifier from the one or more servers and selecting the position, the plurality of items of content of the list of items of content within the application window by inserting, for display within the application window, the second content identifier of the second item of content into the list of items of content.

18. The non-transitory computer-readable storage medium storing instructions of claim 17, wherein the one or more data processors perform:

detecting the scrolling interaction with the list of items of content in the direction of scrolling, the value of the parameter comprising a predetermined value corresponding to the direction of scrolling;

selecting the position of the plurality of the predetermined positions subsequent to the first item of content in the direction of scrolling according to the value of the parameter; and inserting the second item of content into the list of items of content subsequent to the first item of content in the direction of scrolling.

\* \* \* \* \*